United States Patent
McMahon

(10) Patent No.: US 6,443,095 B1
(45) Date of Patent: Sep. 3, 2002

(54) LIVE INSECT BIRD FEEDER AND METHOD

(76) Inventor: Linda McMahon, 7200 SW. 17th Pl., Gainesville, FL (US) 32607

( * ) Notice: Subject to any disclaimer, the term of this patent is extended or adjusted under 35 U.S.C. 154(b) by 0 days.

(21) Appl. No.: 09/731,180

(22) Filed: Dec. 7, 2000

(51) Int. Cl.$^7$ ................................................ A01K 5/00
(52) U.S. Cl. ................................................... 119/51.01
(58) Field of Search ..................... 119/51.01, 6.5–6.7; D30/121, 124, 127, 130

(56) References Cited

U.S. PATENT DOCUMENTS

| | | | | |
|---|---|---|---|---|
| 2,591,459 A | * | 4/1952 | Meany ...................... | 119/52.1 |
| D273,430 S | * | 4/1984 | Salinas ...................... | D30/130 |
| 4,441,458 A | * | 4/1984 | Mercil ...................... | 119/51.5 |
| D274,013 S | * | 5/1984 | Sun ........................... | 119/57.8 |
| 5,062,390 A | * | 11/1991 | Bescherer et al. ........... | 119/72 |
| 5,195,463 A | * | 3/1993 | Lorenzana et al. ......... | 119/52.2 |
| 5,377,617 A | * | 1/1995 | Harwich ..................... | 119/57.8 |
| D441,148 S | * | 4/2001 | Bruni et al. ................ | D30/124 |
| 6,237,532 B1 | * | 5/2001 | Derr .......................... | 119/51.01 |

* cited by examiner

*Primary Examiner*—Charles T. Jordan
*Assistant Examiner*—Kimberly S. Smith
(74) *Attorney, Agent, or Firm*—Sven W. Hanson

(57) ABSTRACT

A novel birdfeeder and method of attracting wild birds is provided. A birdfeeder provides a food chamber having a well in which live insects are maintained in a sustaining media. Viewing of and access to, the insects is allowed through access holes which constrain birds from fully entering the food chamber. A presentation platform adjacent the food chamber is used to present a second quantity of insects which are visible to distant birds. The birds are initially attracted to the exposed insects and subsequently induced to remain at the feeder by the insects in the food chamber. Insects such as mealworms are used to attract primarily insect-feeding wild birds such as blue birds.

6 Claims, 2 Drawing Sheets

LIVE INSECT BIRD FEEDER AND METHOD

BACKGROUND OF THE INVENTION

The present invention relates to wild bird feeders and methods of attracting wild birds for observation. In order to attract wild birds for the purpose of observation and study, bird feeders of various types have been developed. Bird feeders attract wild birds to a specific location by presenting an easily accessible supply of food. Wild birds have a great variety of feeding habits, consuming grains, seed as well as insects and other creatures. Prior bird feeders have been directed primarily at delivering seed or grains as feed to those bird species that each such food. Other feeders are designed to present other inert food forms such as suet. However, these devices are not successful in attracting birds which feed primarily on live insects. Bird feeders presenting grains and seed alone are not effective in attracting those bird species that feed predominantly on insects. Storage and presentation of live insects in a bird feeder poses difficulties not present with inert foods such as seeds or grains. Seeds and grains may be stored in bulk with a minimum of maintenance or protection. Live insects must be maintained in an environment which sustains them in order to be attractive to insect-consuming birds. At the same time, the insects must be presented in a manner to be visible and attract birds. While the prior art includes birdfeeders for presenting live insects for attracting wild birds, none include a means for sustaining and maintaining the insects. What is needed is a bird feeder for maintaining and presenting live insects.

SUMMARY OF THE INVENTION

The present invention provides a bird feeder and method of presentation for live insects as a wild bird attractant. The present bird feeder includes a food chamber having a well for retaining a quantity of a sustaining media. The media is selected for sustaining for a period of time a quantity of insects, preferably what are commonly known as mealworms. The food chamber includes entrance holes that are sized to allow access by birds without their being able to entirely enter the chamber. Near the food chamber a presentation platform is provided for presenting a second quantity of live insects. In the present methods of use, a quantity of live insects are established in sustaining media in the feeder well as described. A second quantity of insects are placed on the presentation platform in a position to be clearly visible from locations distant from the bird feeder. The bird feeder is then positioned in a location known to be frequented by wild birds. Birds are initially attracted by observing the second quantity of insects on the presentation platform. Upon arriving at the bird feeder, birds then observe and investigate the insects in the sustaining media. Because the insects in the media are not as readily found and consumed, the birds are induced to remain at the feeder and may be readily observed for a period of time.

DESCRIPTION OF THE PREFERRED EMBODIMENTS

Figure 1:
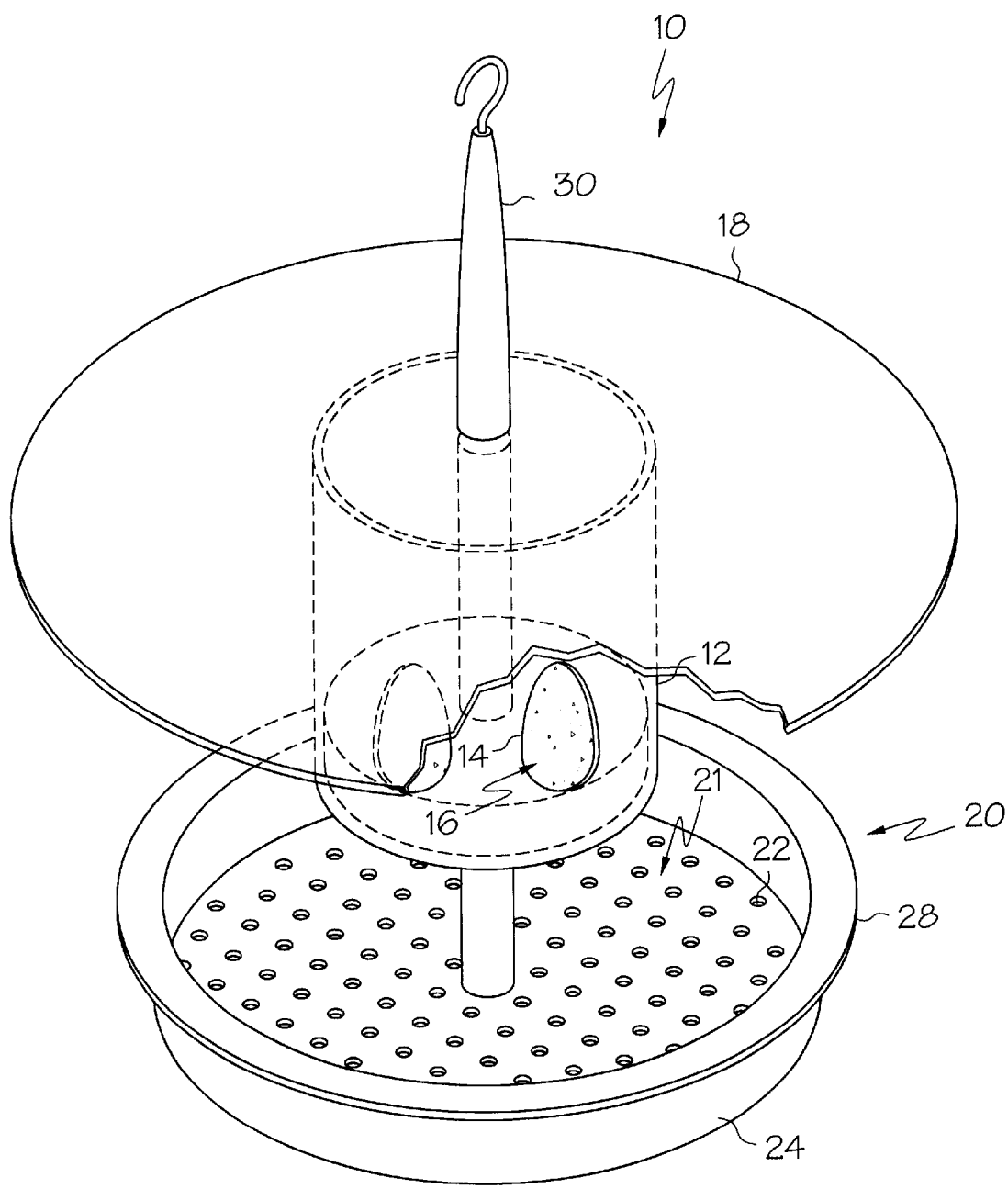
FIG. 1 is a perspective view of one embodiment of the present invention.
Figure 2:
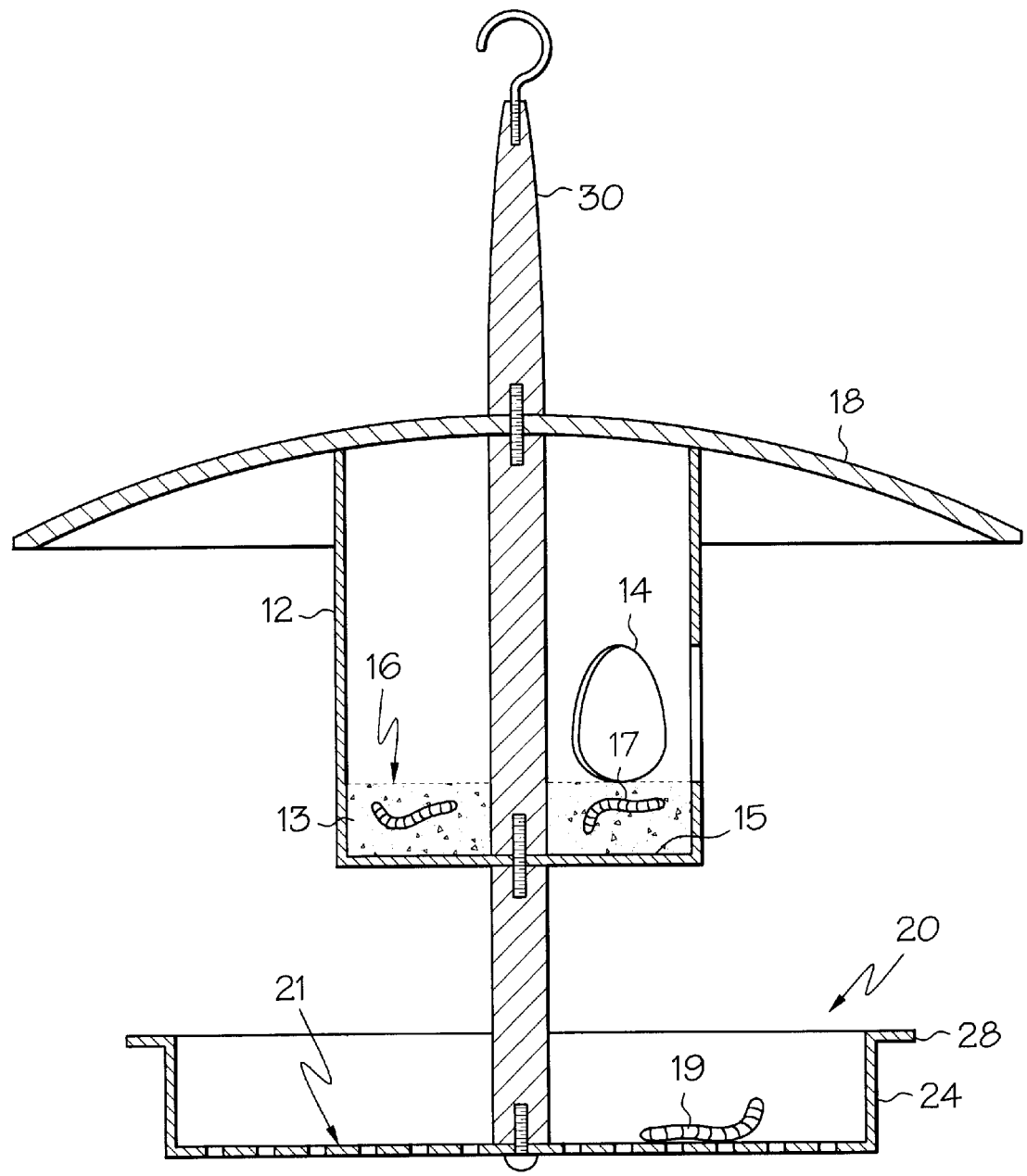
FIG. 2 is a cross section view of the embodiment of FIG. 1 with the addition of live insects as used in the present methods.

FIGS. 1 and 2 depict, respectively, perspective and cross-section views of one embodiment of a birdfeeder 10 according to the present invention. The birdfeeder 10 includes a food chamber 12 having one or more access holes 14. The access holes 14 are offset from a bottom 15 of the chamber 12. The portion of the chamber below the bottom edge of the access holes 14 forms a well 16 for receiving insects together with a sustaining media. In use, insects 17 are retained in a media 13 to sustain them alive for a period of time. The depth of the media 13 is preferably sufficiently small that the insects 17 can not completely conceal themselves within the media. In this way, visiting birds outside the chamber may more easily view and identify the insects presented. The preferred insect is what is commonly known as a mealworm or mealy worm. The type of media 13 and appropriate depth of the well 16 is in part dependent upon the nature of the insect to be used. For mealworms grain-based media can be used including, but not limited to, oat meal, brans, and corn meal. Other types of media may be selected as may be appropriate for other insects. Preferably, the media fills a well 16 having a depth in the range of ½ to ¾ inches. Less than this range will result in the insects attempting crawl out of the media due to insufficient coverage. While a well and media depth much greater than this range decreases the visibility of the mealworm Mealworms placed in a grain-based media in the manner described can be sustained a longer period of time that exposed mealworms. Mealworms which are not provided a sustaining media will most likely die before they will be found and eaten by birds. To preclude frequent replacement of the insects it may be necessary to supply the feeder with 50 or more mealworms, which quantity are sustainable in the birdfeeder configuration described.

The chamber 12 is covered at the top by a rain cover 18 which extends outward from, and overhangs, the chamber 12. The rain cover 18 is solid and prevents rain from entering the access holes 14. The rain cover 18 is similar to those used with previously known birdfeeders. Below the food chamber is a presentation platform 20 having an upper presentation surface 21, through-holes 22 for drainage, and a side wall 24 to prevent insects from leaving the presentation platform. A side wall height of 1.5 inches has been found effective. A perching element in the form of a horizontal lip 28 at the top of the side wall 24 is provided for birds to conveniently light on. The lip 28 is positioned at a distance ¾ to 1 inch relatively below the bottom edge of the access holes 14 to encourage viewing by perching birds of the inside of the food chamber 12 through the access holes 14. Other perching structures such as horizontal posts are also contemplated. The size and configuration of the presentation platform 20 is such as to ensure visibility of the presentation surface from points distant from the birdfeeder. The size of the access holes is selected to allow viewing and access by birds to the chamber without allowing birds to completely enter the chamber. Because viewing of the birds by the user is the objective of this device, it is desired to force a visiting bird to retrieve food from the chamber and then consume it from the exterior perch. For birds of the size of a common bluebird, a circular access hole having a diameter of about ½ to 1 inch is preferred. In the figures the access hole is slightly oval in shape, having a nominal width of ¾ inch and height of 1 inch. Alternative access holes have other shapes including slots which allow wider visibility of the chamber interior. However, the objective of allowing limited access to the chamber interior is preferably maintained. While access holes may be located at any circumferential position on the chamber, they most preferably are located only on any one diametrical side. This allows the birdfeeder to be positioned such that birds may only obtain food from the chamber from a location visible to a user at a predetermined relative position. That is, birds cannot "hide" from the user by entering the chamber from a side opposite the viewing user.

The cover 18, chamber 12 and platform 20 shown in the figures are connected by a center post 30 which is formed of multiple sections that interconnect via internal female thread and respective threaded male portions that extend through the various bird feeder structures. Other methods and structures for connecting the bird feeder structures will be obvious to those skilled in making such devices. The birdfeeder may be formed of any of a variety of materials including wood, metals and plastics. The manner of making these structures will also be obvious. In the figures, the bird feeder principal structures are generally circular in shape in horizontal views. Alternative shapes, such as square are also applicable.

In operation, the above birdfeeder is prepared by depositing a quantity of mixed media and live insects 17 (mealworms in FIG. 2) into the well of the food chamber 12 as shown in FIG. 2. The cover 18 is preferably easily removable for this purpose. A second quantity of live insects 19 are then placed onto the presentation platform 20, preferably without media or any other matter which might obstruct the insects 19 from being viewed. As most insect-feeding birds of interest hunt by sight, it is important that the insects on the presentation platform 20 be easily seen from surrounding locations. The birdfeeder is positioned to be seen both by birds in the surrounding environs and by the user. Subject birds are first attracted by the sight of the insects on the presentation platform Upon arriving to eat these insects, they easily view the chamber interior and are induced to search for insects within the media. If the media is of proper depth, portions of insects within the media will be visible and particularly attract the attention of the birds. Because the birds remain outside the birdfeeder chamber while they search the media and eat the insects, they are available for viewing by the user. In the instances where the present birdfeeder contains insects within the food chamber 12 but not on the presentation platform 20, birds may still be attracted to the feeder or incidentally light there. In such cases, they will be induced to remain by their interest in the insects within the chamber. In this way, some of the benefits of the feeder and present methods are gained without presenting "bait" insects on a presentation platform Other insects which may successfully be used to attract birds in the present birdfeeder and with the present methods include, but are not limited to, larvae and pupae of insects such as flies. Due to the nature of the feeder, the insect must be of a type that will be restrained and sustained in a solid media as described and consequently will not, by its nature, quickly seek to leave the feeder.

The preceding discussion is provided for example only. Other variations of the claimed inventive concepts will be obvious to those skilled in the art. Adaptation or incorporation of known alternative devices and materials, present and future is also contemplated. The intended scope of the invention is defined by the following claims.

I claim:

1. A method of attracting and restraining wild birds to a location for observation, the method comprising:

establishing a first quantity of live insects in a sustaining media;

placing and retaining a second quantity of live insects in an exposed position adjacent the first quantity such that the first quantity are observable by birds consuming the second quantity; and placing both first quantity and second quantity in a location frequented by wild birds.

2. The method of claim 1, wherein:

the act of establishing a first quantity of live insects in a sustaining media further comprises:

placing a combination of media and live insects in a well at a depth at which the insects will be retaining without escaping the media and will be readily discovered by nearby birds.

3. The method of claim 2, wherein:

the act of establishing a first quantity of live insects in a sustaining media further comprises:

placing a combination of media and live insects in a well at a depth less than ¾ inch.

4. The method of claim 1, wherein:

the insects are mealworms.

5. The method of claim 4, wherein:

the media is oatmeal.

6. A method of attracting and restraining wild birds to a location for observation, the method comprising:

providing, in the proximity of wild birds, a feeding structure having an accessible well configured for retaining insects in a media;

providing in the well a first quantity of live insects in a sustaining media;

restraining, adjacent the first quantity of live insects, a second quantity of live insects in an exposed manner;

such that birds may be attracted by the sight of the second quantity of live insects and thereafter encouraged to remain on the feeding structure while eating the first quantity of live insects.

* * * * *